United States Patent Office 3,306,920
Patented Feb. 28, 1967

3,306,920
DIALKYLTIN SALTS OF THE POLYESTER CONDENSATION PRODUCTS OF BICYCLO-(2.2.1)-5-HEPTENE - 2,3 - DICARBOXYLIC ACID AND A GLYCOL
John W. Tamblyn and John R. Caldwell, Kingsport, Tenn., assignors to Eastman Kodak Company, Rochester, N.Y., a corporation of New Jersey
No Drawing. Filed June 5, 1963, Ser. No. 285,577
4 Claims. (Cl. 260—429.7)

This invention relates to heat stabilizers for plastic compositions. More particularly this invention relates to certain polyester organotin salts and their use in stabilizing polymers rich in vinyl chloride and vinylidene chloride against thermal degradation.

Vinyl chloride and vinylidene chloride polymers and copolymers are subjected to deterioration at elevated temperatures in the presence of air. It is thought that the thermal degradation of such plastics may be caused by mineral acids, present either as initial impurities in the polymer or generated in the body of the plastic during exposure to heat and air. When so exposed in the form of a film or fiber the plastic first evidences deterioration by an undesirable yellowish discoloration. This is often followed by a gradual deepening of the discoloration to an orange and then through a red-brown to a black color. It is known that such degradation and discoloration can be somewhat lessened by various types of acid absorbers. However, regardless of the theory of how the deterioration occurs or the lessening of the deterioration to a limited degree by the incorporation of acid absorbing substances in the chlorine-containing plastic, fairly rapid degradation of such plastics under the conditions of normal exposure in everyday usages still presents a considerable unsolved problem. Therefore development of a stabilizer that gives increased stability against deterioration caused by heat represents a highly desirable result. After extended investigation we have found such an improved heat stabilizer for polyvinyl and polyvinylidene chloride resins.

One object of this invention is to provide a novel heat stabilizer for plastics. Another object is to provide a polyvinyl and polyvinylidene chloride plastic stabilized against thermal degradation upon exposure to air. A further object is to provide a method of increasing the heat stability of polyvinyl and polyvinylidene chloride resins and films and fibers prepared therefrom. These and other objects will appear hereinafter.

In its broader aspects our invention involves the novel organotin salt of a bicyclo - (2.2.1) - 5 - heptene - 2,3-dicarboxylic acid polyester and its use in stabilizing vinyl chloride and vinylidene chloride polymers. The novel stabilizers of our invention are produced by combining a glycol and bicyclo - (2.2.1) - 5 - heptene - 2,3 - dicarboxylic acid by condensation-type polymerization and preparing the organotin salt of the polyester thus formed. A ratio of 2–5 molecular proportions of bicyclo-(2.2.1)-5-heptene-2,3-dicarboxylic acid or suitable derivative, with 3–6 molecular proportions of a glycol such as ethylene glycol, butenediol-1,4, propylene glycol butylene glycol or the like may be used. The acid may be used in the form of its anhydride or as the free acid. The molecular weight of the polyester from which the organotin salt is prepared is from 500–1800. A particularly effective stabilizer according to our invention is the bis(dibutyltin salt) of the polyester made from ethylene glycol and the anhydride of bicyclo - (2.2.1) - 5 - heptene - 2,3 - dicarboxylic acid. Other organometallic compounds which can be used in preparing the bicyclo-(2.2.1)-5-heptene salts include diethyltin oxide, dihexyltin oxide, diphenyltin oxide, dilauryltin diacetate, tributyltin hydroxide and $(C_4H_9)_3Sn—O—Sn(C_4H_9)_3$.

The most effectve ratio of organotin compound to polyester from which the salt is being prepared is one equivalent of organotin compound to one equivalent of polyester.

We have found our organotin polyester salt stabilizers to be most effective when used in polymers containing at least 10 percent by weight vinyl chloride or vinylidene chloride. We have found the effective stabilizing range of organotin polyester salt of this invention to be from about 0.1 to about 10 percent, the preferred range being 1 to 5 percent, based on the weight of the plastic stabilized therewith.

A further understanding of our invention may be obtained from the following examples, which are intended to be illustrative only. Examples I–III illustrate the preparation of the polymeric organotin heat stabilizer of this invention and Examples IV–VII the stabilization of vinyl chloride and vinylidene chloride polymers therewith.

*Example I*

Four molecular proportions of bicyclo - (2.2.1) - 5-heptene-2,3-dicarboxylic anhydride and three molecular proportions of ethylene glycol were heated and stirred in a nitrogen atmosphere at 180°–200° for three hours. A short-chain polyester (molecular weight 600–700) terminated with carboxyl groups was obtained. Eighty grams of the polyester and 24.5 grams of dibutyltin oxide were heated and stirred at 220° C. for twenty minutes. Under these conditions the tin compound reacted with the carboxyl groups to give a polymeric salt.

*Example II*

Three molecular proportions of bicyclo - (2.2.1) - 5-heptene - 2,3 - dicarboxylic anhydride and two molecular proportions of butenediol - 1,4 were heated at 160–170° for 5 hours while a stream of nitrogen was passed through the melt. A short-chain polyester terminated with carboxyl groups was obtained. Sixty-three g. of the polyester and 59 g. of $(C_4H_9)_3Sn—(C_4H_9)_3$ were heated and stirred at 180–200° for 40 minutes in a nitrogen atmosphere. A polyester terminated with $—Sn(C_4H_9)_3$ groups was obtained.

*Example III*

One molecular proportion of hexamethylene glycol was heated with two molecular proportions of bicyclo-(2.2.1)-5-heptene-2,3-dicarboxylic anhydride at 120–130° for one hour. One molecular proportion of dihexyltin oxide was added and the mixture was stirred in nitrogen at 220° for 30 minutes to form the polymeric tin salt.

*Example IV*

100 grams of polyvinyl chloride having an inherent viscosity of 1.0 in cyclohexanone were roll-compounded for 4 minutes with 30 grams of dioctyl phthalate and 4 grams of the stabilizer of Example I. A film 12-mil thick was compression-molded from rolled slabs and heated in an air oven at 160° C. A control containing no stabilizer was similarly prepared and heated. The following table gives the color of the film after heating in the air oven at 160° C. for various time intervals.

| Stabilizer | Color of Film After Heating in Air at 160° C. for— | | | | | | |
|---|---|---|---|---|---|---|---|
| | 30 min. | 1 Hr. | 2 Hr. | 3 Hr. | 4 Hr. | 6 Hr. | 8 Hr. |
| None | Pale pinkish-brown. | Pinkish-brown | Brown | Dark brown | | Black | Yellow with black spots. |
| Polymeric organotin stabilizer. | | Colorless | Pale yellow | Pale yellow | Pale yellow | Yellow | |

*Example V*

A copolymer made from 52 percent acrylonitrile and 48 percent vinylidene chloride (prepared as in U.S. Patent 2,843,572) was dissolved in acetone at a concentration of 15 g. copolymer per 100 cc. acetone. This dope and one containing additionally the dibutyltin polyester stabilizer of Example I were cast on a glass plate with a doctor knife and cured overnight at 60° C. to give a film 3 mils thick. The film was heated in a mechanical convection air oven at 150° C. for up to 4 hours and the development of discoloration observed at 1-, 2- and 4-hour intervals. The results are reported in the following table.

| Heat Stabilizer | Conc., Percent | Color of Film After— | | |
|---|---|---|---|---|
| | | 1 Hr. | 2 Hr. | 4 Hr. |
| None | | Light brown | Brown | Dark brown. |
| Polymeric organotin stabilizer | 3 | Colorless | Colorless | Yellow. |

*Example VI*

The procedure of Example IV was followed with the stabilizer of Example II substituted for that of Example I. The stabilizing effect was comparable to that reported in the table of Example IV for the stabilizer of Example I.

*Example VII*

The procedure of Example IV was repeated using the stabilizer of Example III instead of that of Example I. Stabilizing performance was substantially the same as that shown for the stabilizer of Example I in the table of Example IV.

From the preceding description and examples it is thought apparent that we have provided a novel and effective heat stabilizer for vinyl chloride and vinylidene chloride polymer plastics.

Although the invention has been described in considerable detail with particular reference to certain preferred embodiments thereof, variations and modifications can be effected within the spirit and scope of the invention as described hereinabove, and as defined in the appended claims.

We claim:
1. As a novel heat stabilizer the dialkyltin salt of a low molecular weight polyester obtained by condensing bicyclo - (2.2.1) - 5 - heptene - 2,3 - dicarboxylic acid with a glycol.

2. As a novel heat stabilizer for vinyl chloride and vinylidene chloride polymers the bis(dibutyltin salt) of the 600–700 molecular weight polyester obtained by condensing about three molecular proportions of ethylene glycol with about four molecular proportions of bicyclo-(2.2.1)-5-heptene-2,3-dicarboxylic anhydride.

3. A process for the production of a heat stabilizer for plastics which comprises admixing about four molecular proportions of bicyclo - (2.2.1) - 5 - heptene - 2,3 - dicarboxylic anhydride and about three molecular proportions of ethylene glycol, heating for about three hours at about 180°–200°C. in a nitrogen atmosphere, heating the resulting polyester with a salt-forming amount of dibutyltin oxide with stirring to a temperature of about 220° C. for about 20 minutes and collecting the dibutyltin salt polymeric product.

4. As a novel heat stabilizer for vinyl chloride and vinylidene chloride polymers a compound selected from the group consisting of the dibutyltin, diethyltin, dihexyltin, diphenyltin, dilauryltin, and tributyltin salts of a low molecular weight polyester obtained by condensing bicyclo - (2.2.1) - 5 - heptene - 2,3 - dicarboxylic acid with a glycol.

References Cited by the Examiner
UNITED STATES PATENTS 2,950,265   8/1960   Caldwell et al. _____ 260—31.6
3,012,018  12/1961   Marinelli et al. ___ 260—429.7 X HELEN M. McCARTHY, *Primary Examiner.*

TOBIAS E. LEVOW, W. F. W. BELLAMY,
*Assistant Examiners.*